United States Patent
Yoneda

(10) Patent No.: US 12,537,473 B2
(45) Date of Patent: Jan. 27, 2026

(54) IMAGE FORMATION DEVICE AND OVERCURRENT DETECTION METHOD

(71) Applicant: KYOCERA Document Solutions Inc., Osaka (JP)

(72) Inventor: Shogo Yoneda, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 329 days.

(21) Appl. No.: 18/546,654

(22) PCT Filed: Feb. 16, 2022

(86) PCT No.: PCT/JP2022/006081
§ 371 (c)(1),
(2) Date: Feb. 21, 2024

(87) PCT Pub. No.: WO2022/176882
PCT Pub. Date: Aug. 25, 2022

(65) Prior Publication Data
US 2024/0223121 A1    Jul. 4, 2024

(30) Foreign Application Priority Data
Feb. 17, 2021 (JP) .................. 2021-023541

(51) Int. Cl.
*H02P 4/00* (2006.01)
*G03G 15/00* (2006.01)
(Continued)

(52) U.S. Cl.
CPC ....... *H02P 29/027* (2013.01); *G03G 15/0105* (2013.01); *G03G 15/80* (2013.01); *H02P 4/00* (2013.01)

(58) Field of Classification Search
CPC ..... H02P 29/027; H02P 4/00; G03G 15/0105; G03G 15/80
See application file for complete search history.

(56) References Cited

U.S. PATENT DOCUMENTS 3,961,165 A * 6/1976 Fukuoka ................ H04N 1/053
377/54
8,812,891 B2 * 8/2014 Arimoto .................. G06F 1/26
713/340
(Continued)

FOREIGN PATENT DOCUMENTS

JP    H07272078 A    10/1995
JP    2008139536 A *  6/2008
(Continued)

*Primary Examiner* — Thai T Dinh
(74) *Attorney, Agent, or Firm* — Alleman Hall & Tuttle LLP

(57) ABSTRACT

An image formation device includes a plurality of motors, an overcurrent detection portion, a load application portion, and a specification portion. The plurality of motors each include an output shaft. The overcurrent detection portion detects an overcurrent with respect to a resultant current including currents flowing through the plurality of motors. The load application portion applies, while the plurality of motors are being rotated, a load to the output shaft of at least some of the plurality of motors. The load applied by the load application portion is a load for causing fluctuation components that enables the currents of the plurality of motors to be distinguished from one another to be generated in the resultant current. The specification portion specifies, when the overcurrent is detected, a motor that is a cause of the overcurrent from among the plurality of motors based on the resultant current.

7 Claims, 8 Drawing Sheets

(51) Int. Cl.
*G03G 15/01* (2006.01)
*H02P 29/024* (2016.01)

(56) References Cited

U.S. PATENT DOCUMENTS

| | | | |
|---|---|---|---|
| 9,417,592 B2* | 8/2016 | Kondo | G03G 15/80 |
| 2010/0239303 A1* | 9/2010 | Matsumoto | H02M 3/156 |
| | | | 399/88 |

FOREIGN PATENT DOCUMENTS

| | | | |
|---|---|---|---|
| JP | 2009109561 A | | 5/2009 |
| JP | 2010217663 A | * | 9/2010 |
| JP | 2015205769 A | * | 11/2015 |

* cited by examiner

IMAGE FORMATION DEVICE AND OVERCURRENT DETECTION METHOD

TECHNICAL FIELD

The present invention relates to an image formation device and an overcurrent detection method.

BACKGROUND

As a related art, there is known an image formation device having a configuration in which whether an overcurrent has occurred is determined using detection signals of a plurality of overcurrent detection circuits as one overcurrent detection signal (see, for example, Patent Literature 1). In the image formation device according to the related art, when an overcurrent detection signal that indicates that an overcurrent has occurred in one of a plurality of motors (toner motors) is input, the plurality of motors are temporarily stopped, and the plurality of motors are then driven one by one in order. Then, when the plurality of motors are driven in order, this image formation device specifies the motor that is driven at that time as a motor in which the overcurrent has occurred under a condition that the overcurrent detection signal has been input.

CITATION LIST

Patent Literature

Patent Literature 1: Japanese Unexamined Patent Application Publication No. 2009-109561

SUMMARY

Technical Problem

With the configuration of the related art, when an overcurrent occurs, there is a need to temporarily stop the plurality of motors and drive the plurality of motors one by one in order, with the result that it takes time to specify the motor that is a cause of the overcurrent since the occurrence of the overcurrent.

The present invention aims at providing an image formation device which makes it easy to shorten a time required for specifying a motor that is a cause of an overcurrent since an occurrence of the overcurrent, and an overcurrent detection method.

Solution to Problem

An image formation device according to an aspect of the present invention includes a plurality of motors, an overcurrent detection portion, a load application portion, and a specification portion. The plurality of motors each include an output shaft. The overcurrent detection portion detects an overcurrent with respect to a resultant current including currents flowing through the plurality of motors. The load application portion applies, while the plurality of motors are being rotated, a load for causing fluctuation components to be generated in the resultant current to the output shaft of at least some of the plurality of motors, the fluctuation components enabling the currents of the plurality of motors to be distinguished from one another. The specification portion specifies, when the overcurrent is detected, a motor that is a cause of the overcurrent from among the plurality of motors based on the resultant current.

An overcurrent detection method according to another aspect of the present invention is an overcurrent detection method executed in an image formation device including a plurality of motors each including an output shaft, and includes overcurrent detection processing, load application processing, and specification processing. The overcurrent detection processing includes detecting an overcurrent with respect to a resultant current including currents flowing through the plurality of motors. The load application processing includes applying, while the plurality of motors are being rotated, a load for causing fluctuation components to be generated in the resultant current to the output shaft of at least some of the plurality of motors, the fluctuation components enabling the currents of the plurality of motors to be distinguished from one another. The specification processing includes specifying, when the overcurrent is detected, a motor that is a cause of the overcurrent from among the plurality of motors based on the resultant current.

Advantageous Effects of Invention

According to the present invention, it is possible to provide an image formation device which makes it easy to shorten a time required for specifying a motor that is a cause of an overcurrent since an occurrence of the overcurrent, and an overcurrent detection method.

DETAILED DESCRIPTION

Embodiments of the present invention will be described below with reference to the accompanying drawings. It is noted that the following embodiments are examples of embodying the present invention and do not limit the technical scope of the present invention.

Embodiment 1

[1] Overall Configuration of Image Formation Device

First, an overall configuration of an image formation device 10 according to the present embodiment will be described with reference to FIG. 1.

As an example, the image formation device 10 according to the present embodiment is a multifunction peripheral having a plurality of functions such as a scanning function for acquiring image data from a document sheet, a printing function for forming an image based on image data, a facsimile function, and a copying function. The image formation device 10 may be a printer, a facsimile apparatus, a copying machine, or the like.

Figure 1:
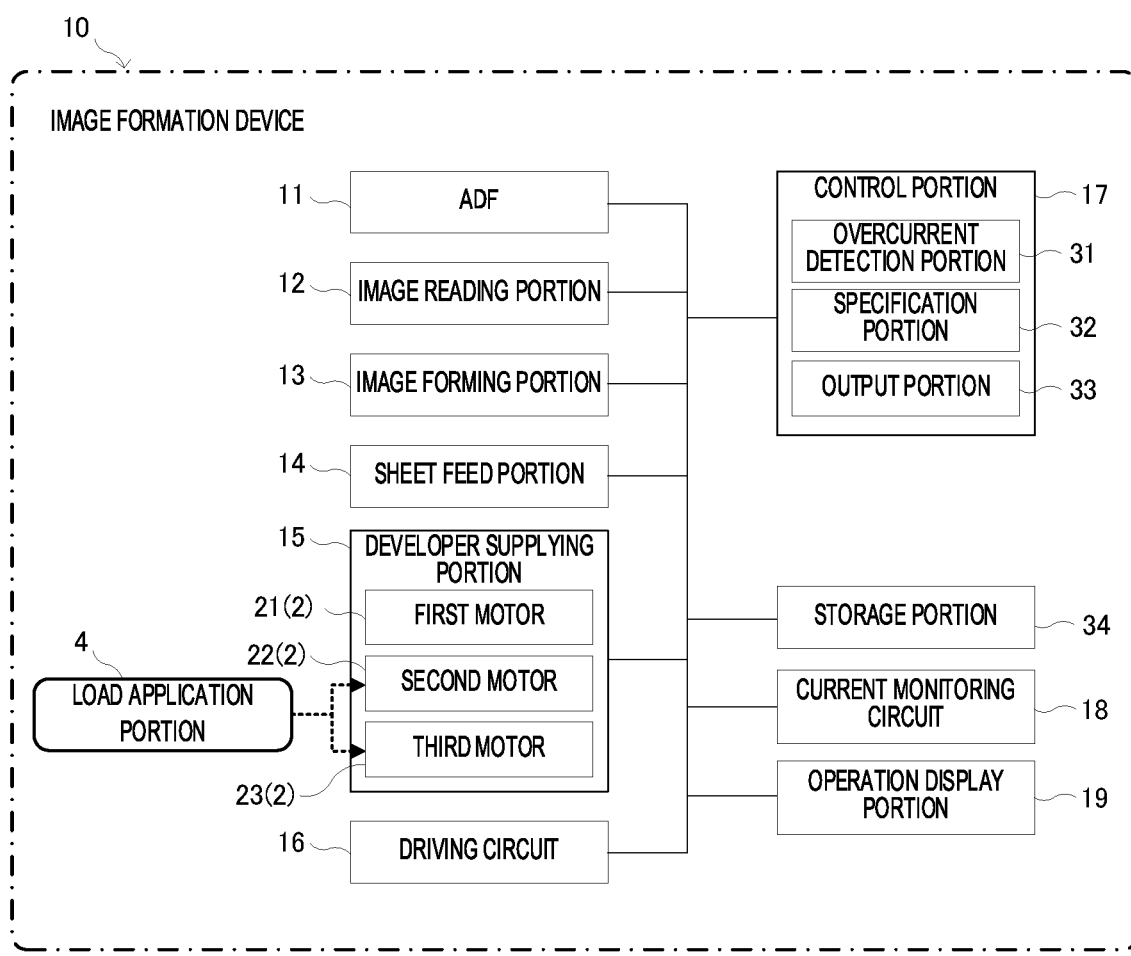
FIG. 1 is a block diagram showing a configuration of an image formation device according to Embodiment 1.

As shown in FIG. 1, the image formation device 10 further includes an automatic document sheet conveying device 11, an image reading portion 12, an image forming portion 13, a sheet feed portion 14, a developer supplying portion 15, a driving circuit 16, a control portion 17, a storage portion 34, a current monitoring circuit 18, and an operation display portion 19. The automatic document sheet conveying device 11 is noted as "ADF" in FIG. 1 since it is an ADF (Automatic Document Feeder), and will also be referred to as "ADF 11" in descriptions below.

The image formation device 10 according to the present embodiment includes a plurality of motors 2. The plurality of motors 2 may include, for example, motors used by functions of the respective portions of the image formation device 10, such as a toner motor, a lift-up motor, an imaging driving motor, and a conveyance driving motor. As an example, in the present embodiment, the plurality of motors 2 include three motors 2, that is, a first motor 21, a second motor 22, and a third motor 23, and these three motors 2 are all toner motors that are included in the developer supplying portion 15. In the present disclosure, unless there is a need to distinguish these first motor 21, second motor 22, and third motor 23 from one another, each of the first motor 21, the second motor 22, and the third motor 23 will simply be referred to as the "motor 2".

The ADF 11 conveys a document sheet from which an image is to be read by the image reading portion 12. The ADF 11 includes a document sheet setting portion, a plurality of conveying rollers, a document sheet holder, a sheet discharge portion, and the like.

The image reading portion 12 reads an image from a document sheet and outputs image data corresponding to the read image. The image reading portion 12 includes a document sheet table, a light source, a plurality of mirrors, an optical lens, a CCD (Charge Coupled Device), and the like.

The image forming portion 13 forms an image on a sheet by electrophotography based on the image data output from the image reading portion 12. Moreover, the image forming portion 13 forms an image on a sheet based on image data input from an information processing apparatus outside the image formation device 10, such as a personal computer. The image forming portion 13 includes four image forming units respectively corresponding to four colors of C (cyan), M (magenta), Y (yellow), and K (black), a laser scanning unit, an intermediate transfer belt, a secondary transfer roller, a fixing device, and the like. For example, the image forming portion 13 may have a configuration in which an image is formed on a sheet using an image forming system other than electrophotography, such as an ink-jet system.

The sheet feed portion 14 supplies a sheet to the image forming portion 13. The image forming portion 13 forms an image on the sheet supplied from the sheet feed portion 14.

The developer supplying portion 15 supplies toner as developer to the image forming portion 13. Using the toner supplied from the developer supplying portion 15, the image forming portion 13 forms an image on a sheet. When the image forming portion 13 forms an image using an ink-jet system, the developer supplying portion 15 supplies ink (another example of the developer) to the image forming portion 13 instead of toner.

The developer supplying portion 15 includes the plurality of (herein, three) motors 2 including the first motor 21, the second motor 22, and the third motor 23. The plurality of motors 2 each include an output shaft 200 (see FIG. 2). The plurality of motors 2 are supplied with electric power to operate so as to cause the respective output shafts 200 to rotate. In other words, each of the plurality of motors 2 converts electric energy into mechanical energy, and outputs the converted mechanical energy from the output shaft 200.

The first motor 21, the second motor 22, and the third motor 23 are all toner motors and each drive a conveying screw for conveying toner. Therefore, the output shaft 200 of each of the motors 2 is mechanically connected to the conveying screw via a transmission mechanism including an electromagnetic clutch, a speed reducer, and the like, for example. In other words, by the conveying screw rotating upon receiving power from the motor 2, the developer supplying portion 15 executes the supply of toner to the image forming portion 13.

Herein, as the toner supplied by the developer supplying portion 15, there are a plurality of colors of toner, the plurality of colors including, for example, C (cyan), M (magenta), Y (yellow), and K (black). In this regard, the developer supplying portion 15 includes the plurality of motors 2 as the toner motors so as to correspond to these plurality of colors of toner. As an example, in the present embodiment, it is presumed that the first motor 21, the second motor 22, and the third motor 23 respectively correspond to toner of C (cyan), M (magenta), and Y (yellow). In other words, the first motor 21 drives the conveying screw to supply the C (cyan) toner to the image forming portion 13, the second motor 22 drives the conveying screw to supply the M (magenta) toner to the image forming portion 13, and the third motor 23 drives the conveying screw to supply the Y (yellow) toner to the image forming portion 13.

In actuality, when supplying the toner of four colors of C (cyan), M (magenta), Y (yellow), and K (black), the developer supplying portion 15 includes a motor corresponding to the K (black) toner (fourth motor) in addition to the three motors 2. It is noted that in the present embodiment, overcurrent monitoring targets at one port of an overcurrent detection portion 31 (see FIG. 1) to be described later are presumed to be the three motors 2 respectively corresponding to the toner of C (cyan), M (magenta), and Y (yellow). In other words, the motor corresponding to the K (black) toner becomes an overcurrent monitoring target at a different port from the first motor 21, the second motor 22, and the third motor 23. In this regard, in the present embodiment, unless otherwise stated, descriptions on the motors 2 refer to the three motors 2 excluding the motor corresponding to the K (black) toner out of the plurality of toner motors included in the developer supplying portion 15.

The driving circuit 16 is a circuit which supplies electric power (electric energy) to the plurality of motors 2 to drive the plurality of motors 2. As an example, in the present embodiment, the plurality of motors 2 are each a permanent magnet field type DC motor that operates by being applied with a DC voltage, and each operate at a rotation speed and torque corresponding to a magnitude of the input (applied)

DC voltage. Therefore, the driving circuit 16 applies a DC voltage to each of the plurality of motors 2, to thus cause a rotor (rotator) including the output shaft 200 of each motor 2 to rotate. The motor 2 is not limited to the permanent magnet field type DC motor and may be, for example, a winding-field type DC motor, a brushless direct current (DC) motor, an AC motor, or the like.

In this type of motor 2, the rotation speed changes according to the magnitude of the input (applied) DC voltage, and the rotation speed increases as the input DC voltage increases. In the present embodiment, the driving circuit 16 outputs the same DC voltage to the plurality of motors 2 such that the rotation speeds of the plurality of motors 2 become common and constant among the plurality of motors 2.

The control portion 17 collectively controls the image formation device 10. The control portion 17 is mainly constituted by a computer system including one or more processors and one or more memories. In the image formation device 10, the one or more processors execute programs to realize functions of the control portion 17. The programs may be recorded in advance in a memory (storage portion 34), may be provided via a telecommunication line such as the Internet, or may be provided by being recorded onto a computer-system-readable non-transitory recording medium such as a memory card or an optical disc. The one or more processors are constituted by one or more electronic circuits including a semiconductor integrated circuit. In addition, the computer system used herein includes a microcontroller including one or more processors and one or more memories. The control portion 17 may be a control portion provided separate from a main control portion which collectively controls the image formation device 10.

The storage portion 34 includes one or more nonvolatile memories, and information such as control programs for causing the control portion 17 to execute various types of processing is stored in advance. In addition, the storage portion 34 is used as a temporary storage memory (working area) for the various types of processing executed by the control portion 17.

The current monitoring circuit 18 is a circuit which monitors currents flowing through the motors 2. The current monitoring circuit 18 outputs a monitoring signal corresponding to a magnitude of a current flowing through the motor 2 to the overcurrent detection portion 31 of the control portion 17, to enable an overcurrent caused in the motor 2 to be detected by the overcurrent detection portion 31. It is noted that in the present embodiment, since the overcurrent monitoring targets at one port of the overcurrent detection portion 31 are the plurality of (herein, three) motors 2, the current monitoring circuit 18 generates one monitoring signal for these plurality of motors 2, and outputs the signal to the one port of the control portion 17. Specifically, the current monitoring circuit 18 measures a total of the currents flowing through the first motor 21, the second motor 22, and the third motor 23, that is, a "resultant current" obtained by adding the currents flowing through the three motors 2. Then, the current monitoring circuit 18 outputs a monitoring signal corresponding to the measured resultant current to the control portion 17.

Specifically, the current monitoring circuit 18 measures a resultant current of currents flowing from the driving circuit 16 to the first motor 21, the second motor 22, and the third motor 23 by a shunt resistor, a current transformer, or the like, and outputs a monitoring signal including the measurement result to the one port of the control portion 17. Thus, in the control portion 17, by the monitoring signal input to one port, the currents flowing through the first motor 21, the second motor 22, and the third motor 23 can be acquired in a state where the currents cannot be distinguished from one another.

The operation display portion 19 is a user interface in the image formation device 10. The operation display portion 19 includes a display portion such as a liquid crystal display for displaying various types of information in response to control instructions from the control portion 17 and an operation portion such as a switch or a touch panel for inputting various types of information to the control portion 17 according to user operations.

Incidentally, in the image formation device 10, in a situation where an overload is applied to the output shaft 200 of the motor 2 as in a case where the toner is solidified or the like, for example, a state where the motor 2 does not rotate, that is, a state where the motor 2 is locked (restricted) may be caused. There exists a technique of detecting such a state, that is, a locked state so as to inhibit the output shaft 200 from rotating, using currents flowing through the motors 2. Specifically, while an overcurrent exceeding a rated current of the motors 2 flows through the motor 2 in a locked state, it is possible to detect the state where the motor 2 is locked by detecting such an overcurrent.

The "overcurrent" used in the present disclosure refers to a current that is large enough to exceed the rated current of the motors 2 and is, for example, a current that flows through the motor 2 when an overload is applied to the output shaft 200 as in a case where the output shaft 200 of the motor 2 is locked (restricted) or the like. It is noted that even when the output shaft 200 of the motor 2 is not completely locked, such an overcurrent may also flow in a situation where an excessive load is applied to the output shaft 200. Specifically, such an overcurrent does not occur while the motor 2 is operating within a normal range (rated range or allowable range), and the overcurrent occurs when the motor 2 is operated in a state where an overload deviating from the normal range is applied to the output shaft 200.

It is noted that in a case where an overcurrent with respect to the plurality of motors 2 is detected using one port of the overcurrent detection portion 31, devisal is required for specifying, when an overcurrent occurs in any of the plurality of motors 2, the motor 2 which is a cause of the overcurrent.

As a related art related to such devisal, there is known an image formation device in which, when an overcurrent detection signal indicating that an overcurrent has occurred in one of the plurality of motors is input, the plurality of motors are temporarily stopped, and the plurality of motors are then driven one by one in order. When the plurality of motors are driven in order, the image formation device according to the related art specifies the motor that is driven at that time as a motor in which an overcurrent has occurred under a condition that the overcurrent detection signal has been input.

With the configuration of the related art, however, when an overcurrent occurs, there is a need to temporarily stop the plurality of motors and drive the plurality of motors one by one in order, with the result that it takes time to specify the motor that is a cause of the overcurrent since the occurrence of the overcurrent.

In contrast, in the image formation device 10 according to the present embodiment, it is easy to shorten the time required for specifying the motor that is the cause of the overcurrent since the occurrence of the overcurrent as will be described below.

Specifically, as shown in FIG. 1, the image formation device 10 according to the present embodiment includes the overcurrent detection portion 31, a load application portion 4, and a specification portion 32. In the present embodiment, the overcurrent detection portion 31 and the specification portion 32 are provided in the control portion 17 as one function of the control portion 17. The overcurrent detection portion 31 detects an overcurrent with respect to a resultant current including currents flowing through the plurality of motors 2. The load application portion 4 applies, when the plurality of motors 2 are being rotated, a load to the output shaft 200 of at least some of the plurality of motors 2. The load applied by the load application portion 4 is a load for causing fluctuation components that enable the currents of the plurality of motors 2 to be distinguished from one another to be generated in the resultant current. The specification portion 32 specifies, when the overcurrent is detected, the motor 2 that is a cause of the overcurrent from among the plurality of motors 2 based on the resultant current.

According to the configuration described above, even while detecting the overcurrent with respect to the plurality of motors 2 by one port of the overcurrent detection portion 31, the image formation device 10 according to the present embodiment is capable of specifying, when an overcurrent occurs in any of the plurality of motors 2, the motor 2 that is a cause of the overcurrent. In other words, in the image formation device 10, while the plurality of motors 2 are being rotated, the load application portion 4 applies a load for causing fluctuation components to be generated in the resultant current to the output shaft 200 of at least some of the plurality of motors 2, the fluctuation components enabling the currents of the plurality of motors 2 to be distinguished from one another.

In short, in the image formation device 10 according to the present embodiment, by the load application portion 4 applying a load to the output shafts 200, fluctuation components that enable the currents of the plurality of motors 2 to be distinguished from one another are caused to be generated in the resultant current including the currents flowing through the plurality of motors 2. Therefore, according to the fluctuation components included in the resultant current, which of the plurality of motors 2 is rotating can be distinguished. Therefore, by the specification portion 32 specifying, in a state where one of the plurality of motors 2 is locked, the motor 2 that is not rotating out of the plurality of motors 2 based on the resultant current, for example, the motor 2 that is a cause of the overcurrent can be specified.

As a result, according to the image formation device 10 according to the present embodiment, it becomes possible to specify, when an overcurrent occurs, the motor 2 that is a cause of the overcurrent without temporarily stopping the plurality of motors 2 and driving the plurality of motors 2 one by one in order. Thus, there is an advantage that, when an overcurrent occurs, it is easier to shorten the time required for specifying the motor 2 that is a cause of the overcurrent since the occurrence of the overcurrent than the related art in which the plurality of motors 2 are temporarily stopped, and the plurality of motors 2 are then driven one by one in order.

Herein, unlike other constituent elements (excluding the load application portion 4) in the image formation device 10, the load application portion 4 does not have an electric connection relationship with the other constituent elements. In the present embodiment, the load application portion 4 includes a mechanism which mechanically acts on at least some of the plurality of motors 2 to directly apply a load. In FIG. 1, the mechanical action not accompanying an electric connection, that is, the transmission of power is indicated by arrows in dotted lines extending from the load application portion 4 toward the second motor 22 and the third motor 23.

The "load" used in the present disclosure refers to a mechanical load applied to the output shafts 200 of the motors 2. In other words, the load application portion 4 directly or indirectly applies a load (mechanical load) to the output shaft 200 of at least some of the plurality of motors 2. As an example, the present embodiment assumes a case where the load application portion 4 applies a load to only the output shaft 200 of some of the three motors 2 as the overcurrent monitoring targets, that is, two motors 2. It is noted that the load application portion 4 may apply a load to all (herein, three) the output shafts 200 of the plurality of motors 2 as the overcurrent monitoring targets.

[2] Configuration of Load Application Portion

Next, a configuration of the load application portion 4 will be described in detail with reference to FIG. 2 to FIG. 6.

When the plurality of motors 2 are being rotated, the load application portion 4 applies a (mechanical) load to the output shaft 200 of at least some of the plurality of motors 2. The load applied by the load application portion 4 is a load for causing fluctuation components to be generated in a resultant current, the fluctuation components enabling the currents of the plurality of motors 2 to be distinguished from one another. In other words, the load application portion 4 applies a load to the output shaft 200 of at least some of the plurality of motors 2, to thus cause the fluctuation components that enable the currents of the plurality of motors 2 to be distinguished from one another to be generated in the resultant current when the plurality of motors 2 are being rotated.

Specifically, the currents that flow through the motors 2 change according to the magnitude of the load applied to the output shafts 200, and the currents that flow through the motors 2 normally increase as the load applied to the output shafts 200 increases. In addition, in the present embodiment, the magnitude of the load applied to the output shafts 200 by the load application portion 4 is not constant and fluctuates along with the rotation of the output shafts 200. In other words, a switch is made between a "high load state" where the load becomes relatively large and a "low load state" where the load becomes relatively small, based on a rotation angle of the output shaft 200. Then, a current that flows through the motor 2 becomes relatively large in the "high load state", and a current that flows through the motor 2 becomes relatively small in the "low load state". When a load that fluctuates along with the rotation of the output shaft 200 in this manner is applied to the output shaft 200 of a certain motor 2, a fluctuation component (pulses) is generated in the current that flows through this motor 2, and the fluctuation component is also generated in the resultant current.

In the present embodiment, the load application portion 4 applies a load that periodically fluctuates along with the rotation of the output shafts 200 to the output shafts 200 of the second motor 22 and the third motor 23. In other words, the load applied to the output shafts 200 by the load application portion 4 fluctuates in sync with the rotation of the output shafts 200, and thus, for example, when the output shafts 200 rotate N times, the fluctuation of the load occurs M times. Particularly in the present embodiment, the rotation speeds of the plurality of motors 2 are common and constant among the plurality of motors 2. Therefore, in the plurality of motors 2, the output shafts 200 rotate at a uniform speed (common rotation speed) and a constant speed (constant rotation speed), and the load applied by the load application portion 4 also fluctuates at a certain constant rhythm. Therefore, at the very least, by looking at the resultant current corresponding to a load fluctuation cycle, the currents of the plurality of motors 2 can be distinguished from one another. It is noted that the load application portion 4 may apply a load that fluctuates irregularly along with the rotation of the output shafts 200. Further, for example, the rotation speeds of the plurality of motors 2 as the overcurrent monitoring targets may mutually vary.

Further, the load applied to the output shaft 200 by the load application portion 4 somewhat differs for each of the motors 2. In the present embodiment, the load application portion 4 varies, among the plurality of motors 2, at least one of a timing and the number of times at/by which the load fluctuates along with the rotation of the output shafts 200 during a predetermined period. The "timing" at which the load fluctuates, that is used herein, includes a phase with respect to a rotation cycle of the output shaft 200. Moreover, the "number of times" the load fluctuates, that is used herein, refers to the number of times the fluctuation of the load appears while the output shaft 200 rotates once or a plurality of times, and includes 0 times, that is, a case where the fluctuation of the load does not occur. In the present embodiment, by the configuration described below, the load application portion 4 varies the "number of times" the load fluctuates among the three motors 2.

The load application portion 4 applies such a load to the output shaft 200 of at least some of the plurality of motors 2 so as to enable the currents of the plurality of motors 2 to be distinguished from one another based on the resultant current. In short, by the load application portion 4 applying the load, fluctuation components unique to the respective motors 2 are imparted to the currents flowing through the plurality of motors 2. Therefore, even from the resultant current in a state where the currents of the plurality of motors 2 are added, the currents flowing through the respective motors 2 can be identified by focusing on the fluctuation components unique to the respective motors 2.

Specifically, in the present embodiment, the load application portion 4 applies a load to the output shafts 200 of the two motors 2, that is, the second motor 22 and the third motor 23, out of the three motors 2 including the first motor 21, the second motor 22, and the third motor 23. In other words, the load application portion 4 does not apply a load to the first motor 21 out of the three motors 2 as the overcurrent monitoring targets, and applies a load to only the two remaining motors 2. In addition, the load application portion 4 varies, between the second motor 22 and the third motor 23, the "number of times" the load fluctuates along with the rotation of the output shafts 200 during a predetermined period.

Thus, regarding the currents flowing through the respective motors 2, when focusing on the fluctuation components unique to the respective motors 2, it is possible to identify which of the first motor 21, the second motor 22, and the third motor 23 the current is flowing through. For example, for the first motor 21 that is not applied with a load by the load application portion 4, a fluctuation component is also not generated in the current thereof, so it is possible to identify that the current is the current of the first motor 21 based on the fact that the fluctuation component is not included. On the other hand, for the second motor 22 that has been applied with a load by the load application portion 4, it is possible to identify that the current is the current of the second motor 22 based on the fact that the fluctuation component unique to the second motor 22 is included. In addition, for the third motor 23 that has been applied with a load by the load application portion 4, it is possible to identify that the current is the current of the third motor 23 based on the fact that the fluctuation component unique to the third motor 23 is included.

In addition, in the present embodiment, the load application portion 4 applies a load to the motors 2 other than the one motor 2 (herein, the first motor 21) out of the plurality of motors 2. Therefore, a loss in the motor 2 not applied with a load can be suppressed to be smaller than that in a case where a load is applied to the plurality of motors 2. It is noted that the load application portion 4 may apply a load to all of the output shafts 200 of the plurality of motors 2 as the overcurrent monitoring targets.

Figure 2:
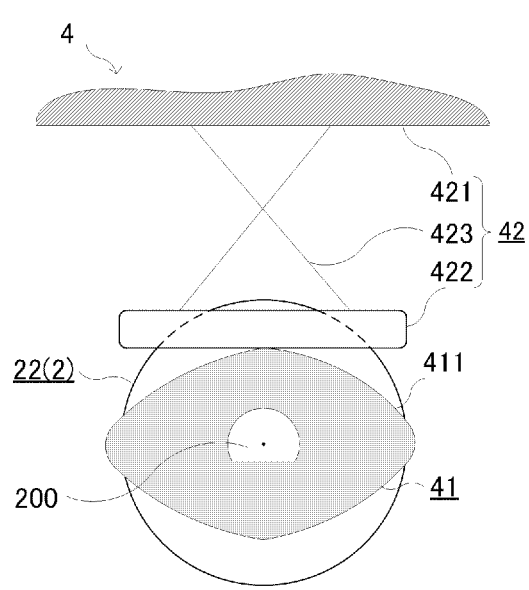
FIG. 2 is a schematic diagram showing a configuration of a load application portion for applying a load to an output shaft of a second motor in the image formation device according to Embodiment 1.
Figure 3:
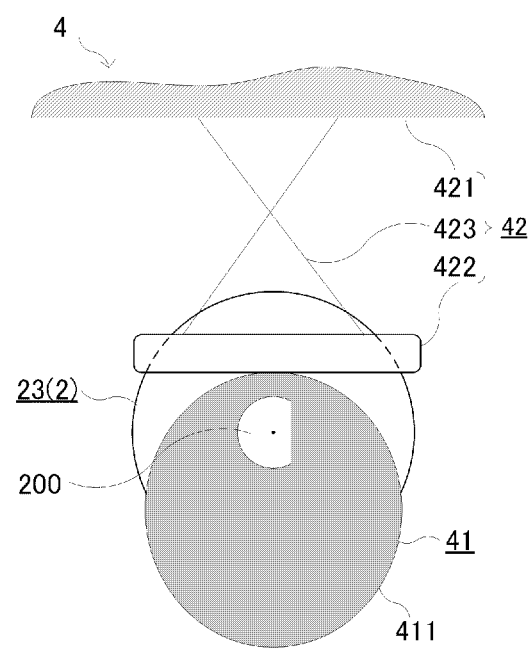
FIG. 3 is a schematic diagram showing a configuration of the load application portion for applying a load to an output shaft of a third motor in the image formation device according to Embodiment 1.

Incidentally, the load application portion 4 includes a mechanism which mechanically acts on at least some of the plurality of motors 2, to directly apply a load. More specifically, as shown in FIG. 2 and FIG. 3, the load application portion 4 includes a cam 41 and a pressing portion 42. The cam 41 is fixed to the output shaft 200 of at least some of the plurality of motors 2 and rotates with the output shaft 200. The cam 41 includes an outer circumferential surface 411 and rotates with the output shaft 200 while causing this outer circumferential surface 411 to slide on the pressing portion 42. The pressing portion 42 comes into contact with the outer circumferential surface 411 of the cam 41 and presses a contact portion on the outer circumferential surface 411 of the cam 41 toward the output shaft 200 side. In other words, since the load application portion 4 does not have an electric connection relationship with other (excluding the load application portion 4) constituent elements in the image formation device 10, the load application portion 4 can be realized with a relatively simple structure.

In the present embodiment, the pressing portion 42 includes a fixing portion 421, a movable portion 422, and an elastic portion 423. The fixing portion 421 is a part of an inner surface of a housing of the image formation device 10, for example. The movable portion 422 is a component that is capable of moving relative to the fixing portion 421 along a normal line (hereinafter, referred to as a "reference straight line") of the fixing portion 421 so that a distance from the fixing portion 421 becomes variable. As an example, the elastic portion 423 is constituted by a pantograph-type extendable mechanism including an elastic body such as a coil spring, and is installed between the fixing portion 421 and the movable portion 422.

With this configuration, the pressing portion 42 presses a surface of the movable portion 422 on the opposite side of the fixing portion 421 against the outer circumferential surface 411 of the cam 41 by an elastic force of the elastic portion 423, to thus cause a pressure to act on the cam 41 from the movable portion 422. In other words, the pressing portion 42 comes into contact with the outer circumferential surface 411 of the cam 41 and presses the contact portion on the outer circumferential surface 411 of the cam 41 toward the output shaft 200 side, that is, toward an opposite side of the fixing portion 421. Then, since the elastic portion 423 is compressed by the movable portion 422 moving in a direction in which it approaches the fixing portion 421 in the pressing portion 42, the pressure that acts on the cam 41 from the movable portion 422 increases as the movable portion 422 approaches the fixing portion 421.

The cam 41 is directly fixed to the output shaft 200 of the motor 2 that is to be applied with a load by the load application portion 4. As an example, the output shaft 200 is a D-cut shaft having a flat portion at a part of an outer circumference thereof, and the cam 41 is fixed to the output shaft 200 in a state where the output shaft 200 is inserted into a D-shaped hole formed in the cam 41. Thus, the cam 41 rotates together with the output shaft 200, and the cam 41 rotates once as the output shaft 200 rotates once.

Herein, the cam 41 is an eccentric cam having an eccentric outer circumferential surface 411 with respect to a rotation center (that is, a rotation center of the output shaft 200) or an odd-shaped cam in which the outer circumferential surface 411 takes a non-round shape such as an oval in a plan view. With such a cam 41, the contact portion on the outer circumferential surface 411 with the pressing portion 42, that is, a portion of the outer circumferential surface 411 opposing the movable portion 422, is displaced along the reference straight line along with the rotation of the cam 41. As a result, by the rotation of the output shaft 200, the movable portion 422 of the pressing portion 42 is pressed by the outer circumferential surface 411 of the cam 41 to be periodically pressed in a direction in which it approaches the fixing portion 421. As described above, since the pressure that acts on the cam 41 from the movable portion 422 increases as the movable portion 422 approaches the fixing portion 421, a reaction force that the cam 41 receives from the pressing portion 42 becomes large in a state where the movable portion 422 is pressed, and thus a load on the output shaft 200 becomes high.

In this manner, when the output shaft 200 rotates, a magnitude of the pressure that acts on the cam 41 from the pressing portion 42 fluctuates, and a magnitude of the load on the output shaft 200 fluctuates. In addition, since the cam 41 rotates in sync with the rotation of the output shaft 200, the load applied to the output shaft 200 by the load application portion 4 periodically fluctuates in sync with the rotation of the output shaft 200. Further, since the cam 41 is directly fixed to the output shaft 200, when the output shaft 200 rotates once, the cam 41 also rotates once. Therefore, the load applied to the output shaft 200 by the load application portion 4 fluctuates (at least once) for sure while the output shaft 200 rotates once.

Moreover, the load application portion 4 applies the load to only the second motor 22 and the third motor 23 out of the first motor 21, the second motor 22, and the third motor 23. Therefore, the cam 41 and the pressing portion 42 as described above are provided for each of the second motor 22 and the third motor 23 as shown in FIG. 2 and FIG. 3. In the load application portion 4, cams 41 having different shapes are applied so as to vary, between the second motor 22 and the third motor 23, the "number of times" the load fluctuates along with the rotation of the output shaft 200 during a predetermined period. In other words, the cam 41 fixed to the output shaft 200 of the second motor 22 and the cam 41 fixed to the output shaft 200 of the third motor 23 have different shapes.

As shown in FIG. 2, the cam 41 fixed to the output shaft 200 of the second motor 22 is an odd-shaped cam which adopts a shape in which a diamond shape (non-round shape) is used as a base and a rotation center (that is, the rotation center of the output shaft 200) is positioned at a center (barycentric position) thereof. In other words, in the cam 41 fixed to the output shaft 200 of the second motor 22, a distance from the contact portion on the outer circumferential surface 411 with the pressing portion 42 (movable portion 422) to the output shaft 200 changes depending on the rotation angle of the cam 41.

Figure 4:
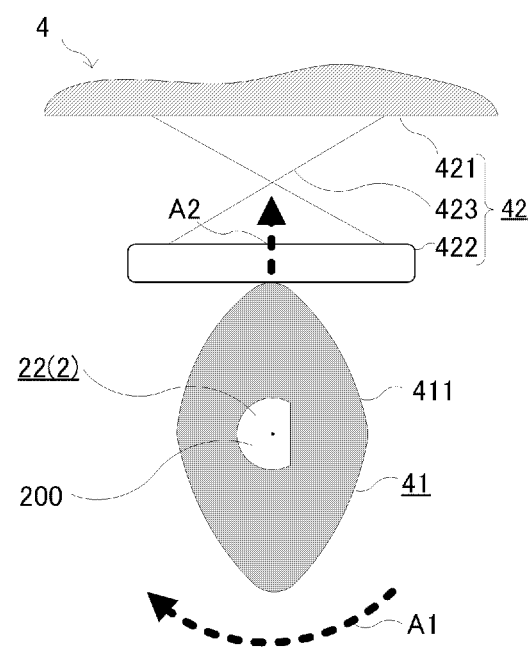
FIG. 4 is a schematic diagram showing a state where a load is applied by the load application portion regarding the second motor in the image formation device according to Embodiment 1.

Therefore, when the output shaft 200 of the second motor 22 rotates 90 degrees in a direction of an arrow A1 as shown in FIG. 4 from the state shown in FIG. 2, the movable portion 422 moves in a direction of an arrow A2 by the cam 41 fixed to the output shaft 200. At this time, since the movable portion 422 gradually approaches the fixing portion 421, the pressure that acts on the cam 41 from the pressing portion 42 gradually increases, and thus a reaction force that the cam 41 receives from the pressing portion 42 becomes maximum and the load on the output shaft 200 also becomes a peak in the state shown in FIG. 4. In FIG. 4, an illustration of a main body of the second motor 22 is omitted.

In other words, in the cam 41 provided in the second motor 22, a portion at which the distance from the output shaft 200 becomes maximum (local maximum point) exists at two positions on the outer circumferential surface 411, and the load on the output shaft 200 becomes maximum in a state where the local maximum point is in contact with the pressing portion 42. Since such a local maximum point exists at a pitch of 180 degrees in the cam 41 fixed to the output shaft 200 of the second motor 22, the peak of the load on the output shaft 200 appears twice while the cam 41 rotates once. Therefore, if an increase and decrease of the load are counted as once in the second motor 22, the fluctuation of the load while the output shaft 200 rotates once appears "twice".

On the other hand, as shown in FIG. 3, the cam 41 fixed to the output shaft 200 of the third motor 23 is an eccentric cam which adopts a shape in which a circular shape (round shape) is used as a base and a rotation center is positioned at a position deviated from a center thereof (eccentric position). In other words, in the cam 41 fixed to the output shaft 200 of the third motor 23, a distance from the contact portion on the outer circumferential surface 411 with the pressing portion 42 (movable portion 422) to the output shaft 200 changes depending on the rotation angle of the cam 41.

Figure 5:
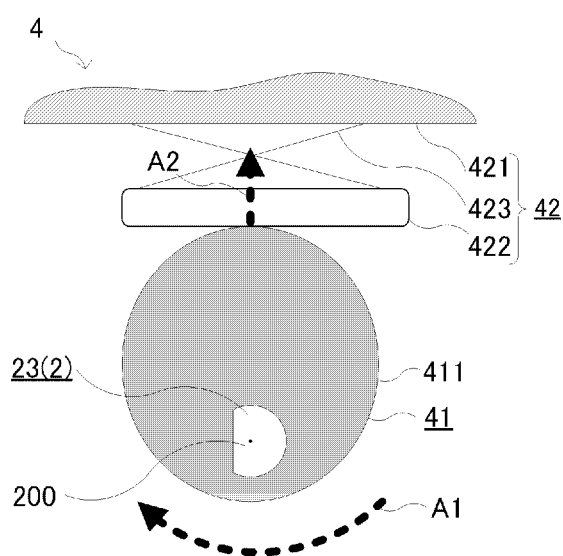
FIG. 5 is a schematic diagram showing a state where a load is applied by the load application portion regarding the third motor in the image formation device according to Embodiment 1.

Therefore, when the output shaft 200 of the third motor 23 rotates 180 degrees in the direction of the arrow A1 as shown in FIG. 5 from the state shown in FIG. 3, the movable portion 422 moves in the direction of the arrow A2 by the cam 41 fixed to the output shaft 200. At this time, since the movable portion 422 gradually approaches the fixing portion 421, the pressure that acts on the cam 41 from the pressing portion 42 gradually increases, and thus a reaction force that the cam 41 receives from the pressing portion 42 becomes maximum and the load on the output shaft 200 also becomes a peak in the state shown in FIG. 5. In FIG. 5, an illustration of a main body of the third motor 23 is omitted.

In other words, in the cam 41 provided in the third motor 23, a portion at which the distance from the output shaft 200 becomes maximum (local maximum point) exists at one position on the outer circumferential surface 411, and the load on the output shaft 200 becomes maximum in a state where the local maximum point is in contact with the pressing portion 42. Since such a local maximum point exists at a pitch of 360 degrees in the cam 41 fixed to the output shaft 200 of the third motor 23, the peak of the load on the output shaft 200 appears once while the cam 41 rotates once. Therefore, if an increase and decrease of the load are counted as once in the third motor 23, the fluctuation of the load while the output shaft 200 rotates once appears "once".

With the configuration described above, the load application portion 4 can vary, between the second motor 22 and the third motor 23, the "number of times" the load fluctuates during a predetermined period in which the output shaft 200 rotates once. Furthermore, since the load is not applied to the first motor 21 in the first place, the "number of times" the load fluctuates during the predetermined period in which the output shaft 200 rotates once is "0 times". Therefore, according to the load application portion 4, a configuration in which the "number of times" the load fluctuates is varied among the three motors 2 is realized. It is noted that the load application portion 4 only needs to vary at least one of the "timing" and the "number of times" at/by which the load fluctuates among the plurality of motors 2, and it is not essential to vary the "number of times" the load fluctuates among the plurality of motors 2.

Further, in the present embodiment, the distance of the local maximum point that is provided on the outer circumferential surface 411 of the cam 41 and at which the distance from the output shaft 200 becomes maximum, from the output shaft 200 (protrusion amount) is set larger in the third motor 23 than in the second motor 22. In short, the distance between the output shaft 200 and the pressing portion 42 in FIG. 5 is larger than the distance between the output shaft 200 and the pressing portion 42 in FIG. 4. Therefore, the load on the output shaft 200 in a state where the local maximum point is in contact with the pressing portion 42 becomes larger in the third motor 23 than in the second motor 22. In addition, a movement width of the movable portion 422 while the output shaft 200 rotates once is also set to be larger in the third motor 23 than in the second motor 22. In other words, in the present embodiment, the load application portion 4 also varies, among the plurality of motors 2, a fluctuation width (that is, an amplitude) when the load fluctuates along with the rotation of the output shaft 200 and a maximum value of the load.

Figure 6:
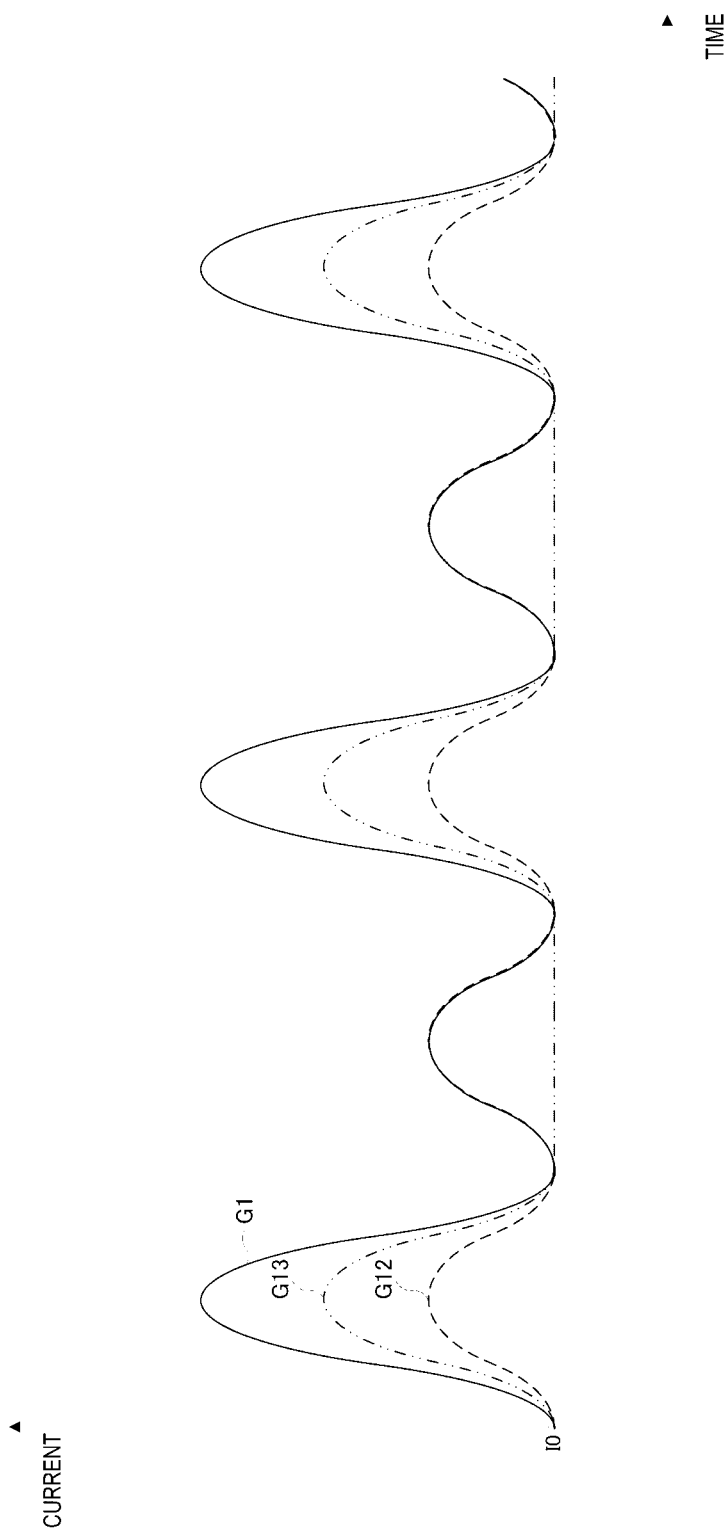
FIG. 6 is a schematic diagram showing an example of a waveform of a resultant current regarding the image formation device according to Embodiment 1.

As a result, as shown in FIG. 6, fluctuation components unique to the respective motors 2 are also included in the resultant current G1 in a state where the currents of the plurality of motors 2 are added. FIG. 6 shows the resultant current G1 in a state where all fluctuation components of the first motor 21, the second motor 22, and the third motor 23 are included, that is, a state where all of the three motors 2 are being rotated. Herein, a base current I0 represents a DC component obtained by removing the fluctuation components in the resultant current G1. In addition, in FIG. 6, a fluctuation component G12 represents a fluctuation component unique to the second motor 22, and a fluctuation component G13 represents a fluctuation component unique to the third motor 23. It is noted that either of the fluctuation component G12 and the fluctuation component G13 represents a fluctuation component in a case where the base current I0 is set as a minimum value, that is, only an addition to the base current I0.

Specifically, by the load application portion 4 applying a load to the output shaft 200 of the second motor 22, the fluctuation component G12 having "two" peaks while the output shaft 200 rotates once is generated in the current of the second motor 22. On the other hand, by the load application portion 4 applying a load to the output shaft 200 of the third motor 23, the fluctuation component G13 having "one" peak while the output shaft 200 rotates once is generated in the current of the third motor 23. It is noted that since the first peak of the fluctuation component G12 is at the same timing as the peak of the fluctuation component G13, the resultant current G1 has "two" peaks while the output shaft 200 rotates once. Furthermore, comparing the fluctuation component G12 and the fluctuation component G13, the fluctuation width and maximum value also become larger in the fluctuation component G13 than in the fluctuation component G12.

By the load application portion 4 applying the load to the output shafts 200 in this manner, the fluctuation components unique to the respective motors 2 are imparted to the currents flowing through the plurality of motors 2, and thus the resultant current G1 includes the fluctuation components G12 and G13 unique to these respective motors 2. In the example of FIG. 6, the resultant current G1 becomes a waveform including the fluctuation component G12 unique to the second motor 22 and the fluctuation component G13 unique to the third motor 23. Herein, since the fluctuation component is not generated for the first motor 21, the fluctuation components included in the resultant current G1 are only the fluctuation component G12 and the fluctuation component G13. According to such a resultant current G1, the currents flowing through the respective motors 2 can be identified by focusing on the fluctuation components G12 and G13 unique to the respective motors 2.

[3] Configuration of Control Portion

Next, the respective functional portions included in the control portion 17 will be described in more detail with reference to FIG. 1. The control portion 17 includes the overcurrent detection portion 31, the specification portion 32, and an output portion 33. In other words, the image formation device 10 includes the output portion 33 as one function of the control portion 17 in addition to the overcurrent detection portion 31 and the specification portion 32.

The overcurrent detection portion 31 detects an overcurrent with respect to the plurality of motors 2 by one port of the control portion 17. Specifically, the resultant current G1 obtained by adding the currents flowing through the plurality of (herein, three) motors 2 is measured by the current monitoring circuit 18, and a monitoring signal corresponding to the resultant current G1 is input to the overcurrent detection portion 31. When input with the monitoring signal, the overcurrent detection portion 31 detects an occurrence of an overcurrent based on a magnitude of the resultant current G1. Specifically, the overcurrent detection portion 31 obtains the base current I0 obtained by removing the fluctuation components from the resultant current G1, and compares the base current I0 with a first threshold value Ith1 for overcurrent detection (see FIG. 8), to detect an overcurrent. It is noted that the overcurrent detection portion 31 merely detects that an overcurrent has occurred in one of the plurality of motors 2 and does not specify the motor 2 in which the overcurrent has occurred.

The specification portion 32 specifies the motor that is a cause of the overcurrent based on the monitoring signal input to the one port of the control portion 17 from the current monitoring circuit 18. When an overcurrent due to a lock of any of the plurality of motors 2 is detected, the specification portion 32 specifies the motor 2 in which the lock has occurred as the motor 2 that is a cause of the overcurrent based on the fluctuation components included in the resultant current G1. In other words, assumed as a cause of the overcurrent in the present embodiment is a case where one of the motors 2 is locked and the output shaft 200 of this motor 2 is in a state where it does not rotate. Therefore, the motor 2 specified by the specification portion 32 as a cause of the overcurrent becomes the motor 2 in which the lock has occurred. Thus, the motor 2 in which the lock has occurred can be specified at an early stage.

Specifically, when an overcurrent is detected by the overcurrent detection portion 31, the specification portion 32 extracts a feature amount of the fluctuation component included in the resultant current G1 from the monitoring signal, to identify whether the fluctuation component unique to any of the motors 2 is included in the resultant current G1. Then, the specification portion 32 specifies the motor 2 whose fluctuation component is not included in the resultant current G1 as the motor 2 that is not rotating out of the plurality of motors 2, that is, the motor 2 that is a cause of the overcurrent. The estimation of the feature amount of the fluctuation component is performed by comparing the resultant current G1 with a second threshold value Ith2 (see FIG. 8) and a third threshold value Ith3 (see FIG. 8) for feature amount estimation.

The output portion 33 performs an output that is based on the specification result obtained by the specification portion 32. Specifically, when the motor 2 that is a cause of the overcurrent is specified by the specification portion 32, an output that is based on that specification result is executed by the output portion 33. An output mode of the output portion 33 includes a notification by display using the operation display portion 19, an audio output, or the like, control of the motor 2, writing of a log in the storage portion 34, transmission to an external terminal using communication, and the like. As an example, if the output mode is the control of the motor 2, the output portion 33 restricts (includes stopping) an output of the motor 2 that is the cause of the overcurrent. According to the output portion 33, the specification result obtained by the specification portion 32 can be utilized.

[4] Overcurrent Detection Method

Figure 7:
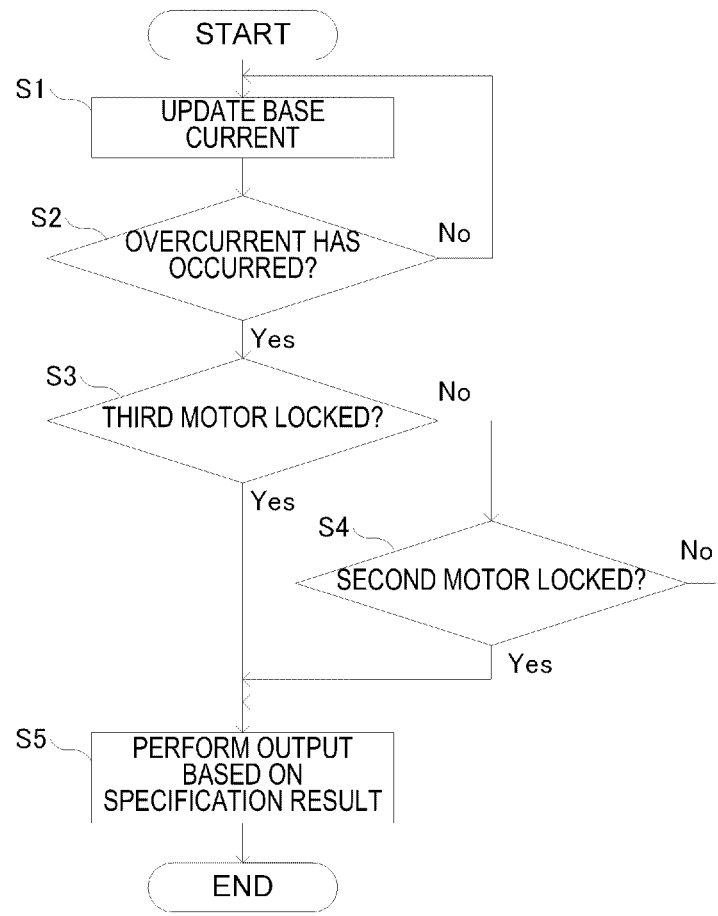
FIG. 7 is a flowchart showing an example of an overcurrent detection method executed in the image formation device according to Embodiment 1.

Hereinafter, exemplary procedures of an overcurrent detection method executed in the image formation device 10 will be described with reference to FIG. 7 and FIG. 8. Herein, Steps S1, S2 . . . in the flowchart shown in FIG. 7 represent numbers of processing procedures (steps) executed by the control portion 17. Also in FIG. 8, an upper diagram shows the resultant current G1 in a case where the third motor 23 is locked, a middle diagram shows the resultant current G1 in a state where the second motor 22 is locked, and a lower diagram shows the resultant current G1 in a case where the first motor 21 is locked.

Herein, it is assumed that the driving circuit 16 is driving the plurality of motors 2. That is, if the plurality of motors 2 are rotating normally, a load will be applied to the output shafts 200 of the second motor 22 and the third motor 23 by the load application portion 4. In other words, load application processing for applying, while the plurality of motors 2 are being rotated, a load to the output shaft 200 of at least some of the plurality of motors 2 is executed in advance.

<Step S1>

First, in Step S1, the control portion 17 executes an update of the base current I0. Specifically, since the resultant current G1 is a current including fluctuation components, the control portion 17 extracts, by the overcurrent detection portion 31, the base current I0 which is a DC component obtained by removing the fluctuation components in the resultant current G1, and updates the latest base current I0. The update of the base current I0 is performed at a certain update cycle (for example, about several seconds). As an example, the control portion 17 extracts a minimum value of the resultant current G1 within the update cycle as the base current I0 or extracts the resultant current G1 from which the fluctuation components have been removed by filter processing as the base current I0.

<Step S2>

In Step S2, the control portion 17 determines whether an overcurrent has occurred by the overcurrent detection portion 31 (overcurrent detection processing). Specifically, the overcurrent detection portion 31 compares the base current I0 updated in Step S1 with the first threshold value Ith1 for overcurrent detection.

Figure 8:
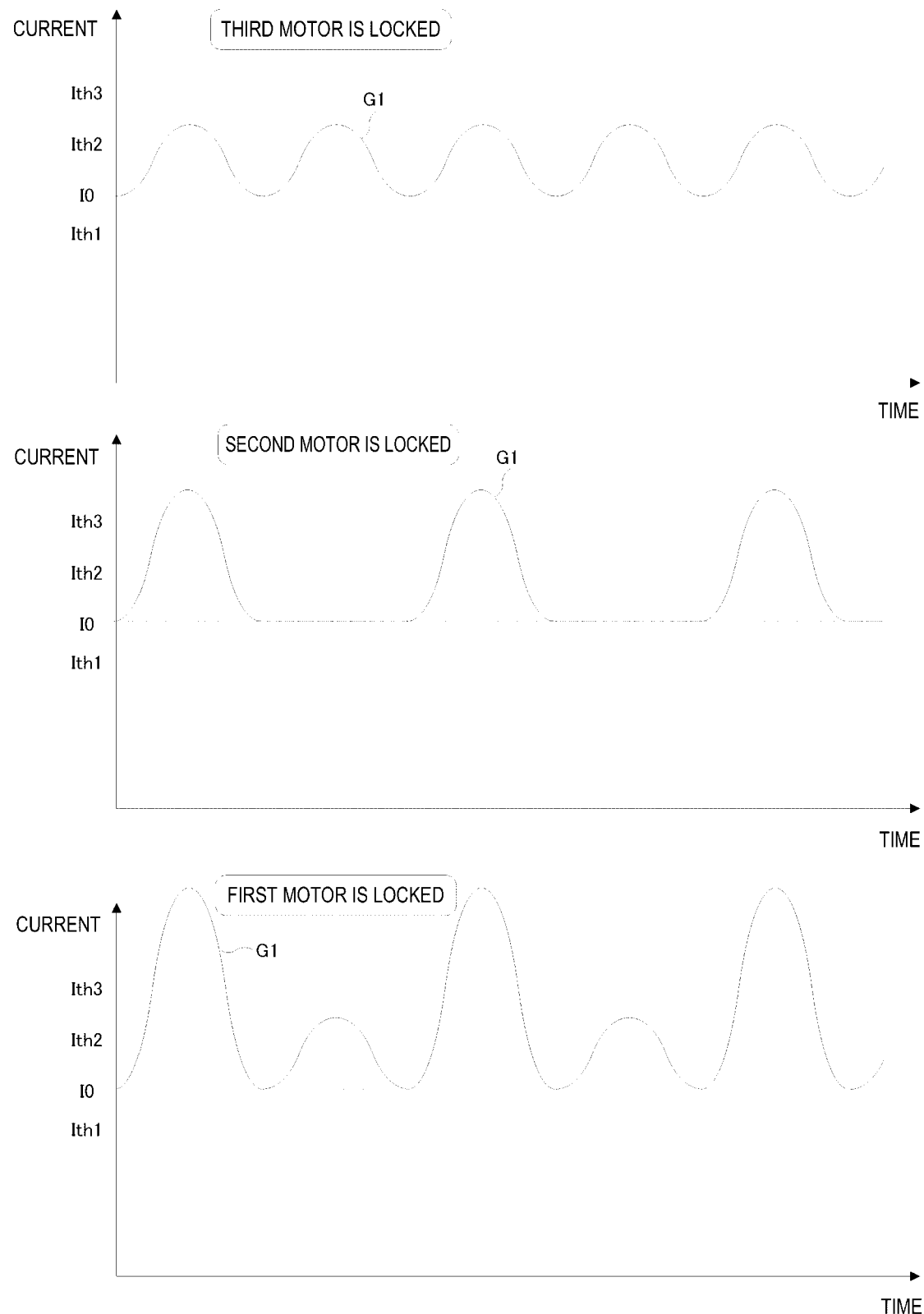
FIG. 8 is a schematic diagram showing examples of waveforms of the resultant current in a case where a first motor, the second motor, and the third motor are locked in the image formation device according to Embodiment 1.

Then, when the base current I0 is equal to or larger than the first threshold value Ith1 as shown in FIG. 8, the overcurrent detection portion 31 determines that an overcurrent has occurred (S2: Yes), and the control portion 17 shifts the processing to Step S3. On the other hand, when the base current I0 is smaller than the first threshold value Ith1, the overcurrent detection portion 31 determines that an overcurrent has not occurred (S2: No), and the control portion 17 shifts the processing to Step S1.

<Step S3>

In Step S3, the control portion 17 determines whether the third motor 23 is locked (specification processing). Specifically, the control portion 17 determines whether a cause of the overcurrent is the third motor 23 by the specification portion 32.

Specifically, the specification portion 32 extracts a feature amount of a fluctuation component included in the resultant current G1 from the monitoring signal, to thus identify whether the fluctuation component unique to any of the motors 2 is included in the resultant current G1. Then, when the fluctuation component unique to the third motor 23 is not included in the resultant current G1, the specification portion 32 determines that the third motor 23 is locked, that is, the third motor 23 is the cause of the overcurrent. More specifically, the specification portion 32 compares the resultant current G1 with the second threshold value Ith2 larger than the first threshold value Ith1 and the third threshold value Ith3 larger than the second threshold value Ith2.

Then, when only pulses in which peaks are equal to or larger than the second threshold value Ith2 and smaller than the third threshold value Ith3 are generated in the resultant current G1 as shown in the upper diagram of FIG. 8, the resultant current G1 includes only the fluctuation components unique to the first motor 21 and the second motor 22. At this time, since the resultant current G1 does not include the fluctuation component unique to the third motor 23, the specification portion 32 determines that the cause of the overcurrent is the third motor 23. In this case, the specification portion 32 determines that the third motor 23 is locked (S3: Yes), and the control portion 17 shifts the processing to Step S5.

On the other hand, when pulses in which peaks are equal to or larger than the third threshold value Ith3 are generated in the resultant current G1, the resultant current includes the fluctuation component unique to the third motor 23. In this case, the specification portion 32 determines that the third motor 23 is not locked (S3: No), and the control portion 17 shifts the processing to Step S4.

<Step S4>

In Step S4, the control portion 17 determines whether the second motor 22 is locked (specification processing). Specifically, the control portion 17 determines whether the cause of the overcurrent is the second motor 22 by the specification portion 32.

Specifically, if the fluctuation component unique to the second motor 22 is not included in the resultant current G1, the specification portion 32 determines that the second motor 22 is locked, that is, the second motor 22 is the cause of the overcurrent. More specifically, the specification portion 32 compares the resultant current G1 with the second threshold value Ith2 and the third threshold value Ith3.

Then, when only pulses in which peaks are equal to or larger than the third threshold value Ith3 are generated in the resultant current G1 as shown in the middle diagram of FIG. 8, the resultant current G1 includes only the fluctuation components unique to the first motor 21 and the third motor 23. In other words, at this time, since the resultant current G1 does not include the fluctuation component unique to the second motor 22, the specification portion 32 determines that the cause of the overcurrent is the second motor 22. In this case, the specification portion 32 determines that the second motor 22 is locked (S4: Yes), and the control portion 17 shifts the processing to Step S5.

On the other hand, when pulses in which peaks are equal to or larger than the third threshold value Ith3 and pulses in which peaks are equal to or larger than the second threshold value Ith2 and smaller than the third threshold value Ith3 are generated in the resultant current G1 as shown in the lower diagram of FIG. 8, the resultant current G1 includes the fluctuation component unique to the second motor 22. In this case, the specification portion 32 determines that the second motor 22 is not locked (S4: No), and the control portion 17 shifts the processing to Step S5. Also in this case, since it is determined that the cause of the overcurrent is neither the third motor 23 nor the second motor 22, the specification portion 32 specifies the first motor 21 as the cause of the overcurrent by an elimination method.

<Step S5>

In Step S5, the control portion 17 executes an output by the output portion 33 based on the specification result obtained by the specification portion 32 (output processing).

For example, when the third motor 23 is specified as the locked motor (S3: Yes), the specification portion 32 executes a notification for notifying an anomaly (lock) of the third motor 23 using the operation display portion 19. Moreover, for example, when the second motor 22 is specified as the locked motor (S4: Yes), the specification portion 32 executes a notification for notifying an anomaly of the second motor 22 using the operation display portion 19. Moreover, for example, when the first motor 21 is specified as the locked motor (S4: No), the specification portion 32 executes a notification for notifying an anomaly of the first motor 21 using the operation display portion 19. Alternatively, the output portion 33 may control the driving circuit 16 to restrict the output of the motor 2 that has been specified as being locked.

The procedures of the overcurrent detection method described above are mere examples, and the order of the processing shown in FIG. 7 may be switched as appropriate. For example, the determination on whether the second motor 22 is locked (S2) may be executed before the determination on whether the third motor 23 is locked (S3).

Further, with the configuration in which the "timing" or the "number of times" at/by which a load fluctuates is varied among the plurality of motors 2 as in the present embodiment, the plurality of motors 2 can be distinguished from one another irrespective of an absolute value of the resultant current G1. For example, the fluctuation components included in the resultant current G1 can be specified from the timing or the number of times at/by which the pulses of the resultant current G1 appear during a predetermined period in which the output shaft 200 rotates once. In this case, since the specification by the specification portion 32 can be performed irrespective of the magnitude of the base current I0, it becomes possible to cope with various overcurrent states.

[5] Modified Example

The plurality of constituent elements included in the image formation device 10 may be provided dispersedly in a plurality of housings. For example, at least one of the overcurrent detection portion 31, the specification portion 32, and the output portion 33 may be provided in a different housing from the control portion 17 without being limited to the configuration in which it is realized as one function of the control portion 17.

Moreover, the overcurrent monitoring targets of the image formation device 10 only need to be the plurality of motors 2 and are not limited to three motors 2, and two motors 2 or four or more motors 2 may be the overcurrent monitoring targets, for example. Further, the plurality of motors 2 as the overcurrent monitoring targets are not limited to the toner motors and may be a different type of motors other than the toner motors, such as a lift-up motor, an imaging driving motor, and a conveyance driving motor, for example. Furthermore, the plurality of motors 2 as the overcurrent monitoring targets may include different types (different functions) of motors like the toner motor and the lift-up motor, for example.

Embodiment 2

The image formation device 10 according to the present embodiment differs from the image formation device 10 according to Embodiment 1 in the point of specifying the motor 2 that is the cause of the overcurrent out of the plurality of motors 2 based on the resultant current G1 obtained when only some of the plurality of motors 2 are rotated. Hereinafter, configurations similar to those of Embodiment 1 are denoted by common reference numerals, and descriptions thereof will be omitted as appropriate.

Specifically, in Embodiment 1, when an overcurrent is detected, the control portion 17 is configured to specify the motor 2 that is a cause of the overcurrent in a state where all of the plurality of motors 2 as the overcurrent monitoring targets are driven. In contrast, in the present embodiment, when an overcurrent is detected, the control portion 17 is configured to specify the motor 2 that is a cause of the overcurrent in a state where some of the plurality of motors 2 as the overcurrent monitoring targets are stopped.

As an example, the plurality of motors 2 as the overcurrent monitoring targets are assumed to be a total of six motors 2 that include two sets of a combination of the first motor 21, the second motor 22, and the third motor 23 described in Embodiment 1. In other words, the overcurrent monitoring targets include a first motor group including the first motor 21, the second motor 22, and the third motor 23 and a second motor group including the first motor 21, the second motor 22, and the third motor 23.

In this case, the image formation device 10 according to the present embodiment specifies, upon detecting an overcurrent in any of the plurality of (herein, six) motors 2, the motor 2 that is a cause of the overcurrent by the following procedures.

Specifically, upon detecting an overcurrent, the image formation device 10 first stops the three motors 2 included in the first motor group. Thus, only the three motors 2 included in the second motor group are continuously driven out of the six motors 2 as the overcurrent monitoring targets. In this state, the overcurrent detection portion 31 detects an overcurrent with respect to the three motors 2 included in the second motor group, that are being driven. At this time, if an overcurrent is detected, the motor 2 that is a cause of the overcurrent should be included in the second motor group, so the specification portion 32 specifies the motor 2 that is a cause of the overcurrent from among the three motors 2 included in the second motor group.

On the other hand, if an overcurrent is not detected in a state where only the three motors 2 included in the second motor group are continuously driven, the motor 2 that is a cause of the overcurrent should be included in the first motor group instead of the second motor group. In this case, the image formation device 10 stops the three motors 2 included in the second motor group and drives the three motors 2 included in the first motor group again. At this time, the motor 2 that is a cause of the overcurrent should be included in the first motor group, so the specification portion 32 specifies the motor 2 that is a cause of the overcurrent from among the three motors 2 included in the first motor group.

The method by which the specification portion 32 specifies the motor 2 that is a cause of the overcurrent from among the three motors 2 is as described in Embodiment 1. In this manner, according to the image formation device 10 according to the present embodiment, even when the number of motors 2 as the overcurrent monitoring targets increases, it becomes easy to specify the motor 2 that is a cause of the overcurrent.

The invention claimed is:

1. An image formation device, comprising:
a plurality of motors each including an output shaft;
an overcurrent detection portion which detects an overcurrent with respect to a resultant current including currents flowing through the plurality of motors;
a load application portion which applies, while the plurality of motors are being rotated, a load for causing fluctuation components to be generated in the resultant current to the output shaft of at least some of the plurality of motors, the fluctuation components enabling the currents of the plurality of motors to be distinguished from one another; and
a specification portion which specifies, when the overcurrent is detected, a motor that is a cause of the overcurrent from among the plurality of motors based on the resultant current, wherein
the load application portion applies the load that periodically fluctuates along with a rotation of the output shaft to the output shaft of the at least some of the plurality of motors, and
the load application portion includes:
a cam which is fixed to the output shaft of the at least some of the plurality of motors and rotates along with the output shaft, and
a pressing portion which comes into contact with an outer circumferential surface of the cam and presses a contact portion on the outer circumferential surface of the cam toward a side of the output shaft.

2. The image formation device according to claim 1, wherein
the load application portion varies, among the plurality of motors, at least one of a timing and a number of times at/by which the load fluctuates along with the rotation of the output shaft during a predetermined period.

3. The image formation device according to claim 1, wherein
the specification portion specifies, when the overcurrent due to a lock of any of the plurality of motors is detected, a motor in which the lock has occurred as the motor that is the cause of the overcurrent based on the fluctuation components included in the resultant current.

4. The image formation device according to claim 1, wherein
the load application portion applies the load to motors other than one of the plurality of motors.

5. The image formation device according to claim 1, wherein
the specification portion specifies the motor that is the cause of the overcurrent from among the plurality of motors based on the resultant current obtained when only some of the plurality of motors are being rotated.

6. The image formation device according to claim 1, further comprising
an output portion which performs an output that is based on a specification result obtained by the specification portion.

7. An overcurrent detection method executed in an image formation device including a plurality of motors each including an output shaft, comprising:
overcurrent detection processing for detecting an overcurrent with respect to a resultant current including currents flowing through the plurality of motors;
load application processing for applying, while the plurality of motors are being rotated, a load for causing fluctuation components to be generated in the resultant current to the output shaft of at least some of the plurality of motors, the fluctuation components enabling the currents of the plurality of motors to be distinguished from one another; and
specification processing for specifying, when the overcurrent is detected, a motor that is a cause of the overcurrent from among the plurality of motors based on the resultant current, wherein
in the load application processing, the load that periodically fluctuates along with a rotation of the output shaft is applied, by a load application portion, to the output shaft of the at least some of the plurality of motors, and
the load application portion includes:
a cam which is fixed to the output shaft of the at least some of the plurality of motors and rotates along with the output shaft, and
a pressing portion which comes into contact with an outer circumferential surface of the cam and presses a contact portion on the outer circumferential surface of the cam toward a side of the output shaft.

* * * * *